United States Patent
Shelby et al.

(10) Patent No.: US 10,313,423 B2
(45) Date of Patent: *Jun. 4, 2019

(54) METHOD, APPARATUS AND SYSTEM FOR WEB SERVICE MANAGEMENT

(71) Applicant: Arm Finland OY, Oulu (FI)

(72) Inventors: Zachary Shelby, Oulu (FI); Sampo Ukkola, Oulu (FI)

(73) Assignee: Arm Finland OY (FI)

( * ) Notice: Subject to any disclaimer, the term of this patent is extended or adjusted under 35 U.S.C. 154(b) by 18 days.

This patent is subject to a terminal disclaimer.

(21) Appl. No.: 15/436,968

(22) Filed: Feb. 20, 2017

(65) Prior Publication Data
US 2017/0223085 A1    Aug. 3, 2017

Related U.S. Application Data

(63) Continuation of application No. 13/705,319, filed on Dec. 5, 2012, now Pat. No. 9,614,877.

(30) Foreign Application Priority Data

Dec. 7, 2011   (FI) ..................................... 20116233

(51) Int. Cl.
*H04L 29/08* (2006.01)
*H04L 29/06* (2006.01)

(52) U.S. Cl.
CPC ............ *H04L 67/025* (2013.01); *H04L 65/40* (2013.01); *H04L 67/02* (2013.01); *H04L 67/26* (2013.01); *H04L 67/12* (2013.01)

(58) Field of Classification Search
CPC ......... H04L 67/02; H04L 67/12; H04L 67/26; H04L 67/025

(Continued)

(56) References Cited

U.S. PATENT DOCUMENTS 9,614,877 B2 * 4/2017 Shelby .................... H04L 65/40
2009/0177772 A1   7/2009 Guan
(Continued)

FOREIGN PATENT DOCUMENTS

WO   2006118500 A1   11/2006
WO   2011159985 A1   12/2011

OTHER PUBLICATIONS

Core Working Group, "Observing Resources in CoAP Draft-Ietf-Core-Observe-03", Harke & Shelby, Expires May 3, 2012, pp. 1-27.
(Continued)

*Primary Examiner* — Kevin T Bates
*Assistant Examiner* — Chen-Liang Huang
(74) *Attorney, Agent, or Firm* — Barnes & Thornburg LLP

(57) ABSTRACT

A method and an apparatus for realizing web service. An apparatus having a binary web service interface to communicate with nodes operationally connected to the apparatus using a binary web service, the nodes having one or more resources, the binary web service interface being configured to receive information from a node whenever a resource of a node changes or whenever a pre-configured event regarding a resource occurs. The apparatus also has an interface for communicating with web applications making use of the resources and ap component for receiving subscriptions regarding the information received from the nodes and providing the subscribed information.

18 Claims, 5 Drawing Sheets

(58) Field of Classification Search
USPC .......................................................... 709/224
See application file for complete search history.

(56) References Cited

U.S. PATENT DOCUMENTS

| | | |
|---|---|---|
| 2011/0066676 A1 | 3/2011 | Kleyzit et al. |
| 2012/0101952 A1 | 4/2012 | Raleigh et al. |
| 2014/0112232 A1 | 4/2014 | Lu et al. |
| 2014/0143855 A1* | 5/2014 | Keoh .................... H04L 63/123 726/14 |

OTHER PUBLICATIONS

Finnish Office Action dated Apr. 17, 2013.
Olitii et al., "REST Enabled Wireless Sensor Networks for Seamless Integration With Web Applications", Mobile Adhoc and Sensor Systems (MASS), 2011 IEEE 8th International Conference, Oct. 17-22, 2011, pp. 867-869.
Shelby, "Embedded Web Services", Wireless Communications, IEEE, Dec. 2010, pp. 52-57.
IETF CoRE Working Group Internet-Draft; Constrained Application Protocol (CoAP) draft-ietf-core-coap-08, Nov. 1, 2011, Internet Engineering Task Force, [retrieved on Sep. 28, 2012), pp. 1-88.
IETF Co RE Working Group Internet-Draft; Observing Resources in CoAP draft-ietf-core-observe-00, Oct. 18, 2010, Internet Engineering Task Force, [retrieved on Sep. 28, 2012), pp. 1-12.
Search Report for priority Finnish Patent Application No. 20116233 dated Apr. 10, 2012.

* cited by examiner

METHOD, APPARATUS AND SYSTEM FOR WEB SERVICE MANAGEMENT

CROSS REFERENCE TO RELATED APPLICATIONS

This patent application is a continuation of U.S. patent application Ser. No. 13/705,319 filed Dec. 5, 2012, entitled METHOD, APPARATUS AND SYSTEM FOR WEB SERVICE MANAGEMENT, which claims priority to Finnish Patent Application No. 20116233, filed 7 Dec. 2011, the disclosure of which is incorporated herein by reference in its entirety.

FIELD

Disclosed embodiments relate to a method, an apparatus and a system for web service management. In particular, disclosed embodiments relate to managing web services in networks comprising machine-to-machine systems.

BACKGROUND

The following description of background art may include insights, discoveries, understandings or disclosures, or associations together with disclosures not known to the relevant art prior but provided by the disclosed embodiments. Some of such contributions may be specifically pointed out below, whereas other such contributions will be apparent from their context.

In modern communication and computer networks, management of network infrastructure equipment, such as personal computers, servers and printers, is an important part of the operation of the network. In a large network comprising tens and hundreds of devices the management of devices requires a systematical approach to be efficient or even possible. Today, the management of infrastructure is performed using standards like the Simple Network Management Protocol (SNMP) and Netconf. These protocols enable the monitoring and possible control of devices connected to the network in a controlled and efficient manner. These methods work well in an Ethernet-based office information technology (IT) environment comprising devices having processor power. Power consumption, traffic overhead and implementation complexity are not a concern in this environment.

Enterprises are rapidly connecting Machine-to-Machine (M2M) systems into their backend IT infrastructure for e.g. energy monitoring, remote machine monitoring, building automation and asset management. M2M systems often include very simple, cheap, battery powered devices connected via deep low-bandwidth access networks. The scale of devices in an M2M network is also massively different, including even up to millions of devices in a single management domain.

Traditional IT system network management solutions and existing protocols like SNMP are too inefficient and complex to managing M2M systems end-to-end.

Prior art machine-to-machine systems have solved this problem by building monolithic, vertical technology all the way from the device to the backend server, often employing proprietary protocols. ISO/IEC 14908-based protocol (LONtalk) is an example of such a system. ISO stands for International Organization for Standardization and IEC for the International Electrotechnical Commission.

More recently, as machine-to-machine devices have become IP enabled, systems have become more open by using IP as a networking protocol, but in order to keep the system efficient, they employ proprietary protocols.

Finally, some devices are starting to be connected to the web; however this is now done using standard HTTP/TLS/TCP technology, which is not suitable for constrained devices or networks. Here HTTP is the Hypertext Transfer Protocol, TLS Transport Layer Security and TCP the Transmission Control Protocol.

These solutions are not designed for deep networks, and extremely large numbers of devices with small processing power and minimum power consumption.

SUMMARY

Disclosed embodiments provide a solution for managing Machine-to-Machine systems and accessing resources offered by M2M devices.

A first disclosed embodiment provides an apparatus, comprising a binary web service interface to communicate with nodes operationally connected to the apparatus using a binary web service, the nodes comprising one or more resources, the binary web service interface being configured to receive information from a node whenever a resource of a node changes or whenever a pre-configured event regarding a resource occurs; an interface for communicating with web applications making use of the resources, a component for receiving subscriptions regarding the information received from the nodes and providing the subscribed information.

A second disclosed embodiment provides a method, comprising communicating with nodes operationally connected to the apparatus using a binary web service, the nodes comprising one or more resources, receiving information from a node whenever a resource of a node changes or whenever a pre-configured event regarding a resource occurs; receiving subscriptions regarding the information received from the nodes and providing the subscribed information.

A third disclosed embodiment provides a method, communicating with nodes operationally connected to the apparatus using a binary web service, the nodes comprising one or more resources, receiving information from a node whenever a resource of a node changes or whenever a pre-configured event regarding a resource occurs; receiving subscriptions regarding the information received from the nodes and providing the subscribed information.

A fourth disclosed embodiment provides a method, comprising receiving from a server address and property information on one or more resources operationally connected to the server, sending the server a subscription request regarding a resource to receive a notification from the server whenever a given resource changes, and receiving a notification from the server when the resource has changed.

BRIEF DESCRIPTION OF THE FIGURES

Disclosed embodiments are described below, by way of example only, with reference to the accompanying drawings, in which.

DETAILED DESCRIPTION OF THE
DISCLOSED EMBODIMENTS

The disclosed embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Data exchange between programs and computers is a vital element. Different programs, computers and processors may exchange data without human intervention. Different networks and protocols are used in different environments. On the Internet, the Transmission Control Protocol/Internet Protocol (TCP/IP) is the basic protocol used in communication. TCP/IP takes care of assembling and disassembling the data to be transmitted in packets. IP handles the addressing so that packets are delivered to the correct destination. Above TCP/IP, the Hypertext Transfer Protocol (HTTP) is used as a client/server protocol. A program may send an HTTP request to a server which responds with another HTTP message.

The exchanges of interoperable messages using APIs (Application Program Interfaces) provided by servers on the Internet are realized by using web services. A web service can be realized in many ways, usually by using a REST (Representational State Transfer) design with the built-in features of a web protocol like HTTP and payload encoding with Extensible Markup Language (XML), or realized as a remote procedure call via SOAP (Simple Object Access Protocol).

Low-power wireless networks, such as IEEE 802.15.4 based embedded and sensor networks, have extremely limited resources for transmitting packets. These networks are very energy-efficient, and the chip technology is cheap. For this reason the technology is making its way to embedded devices very quickly for automation, measurement, tracking and control, for example.

In low-power wireless networks, current web service technologies are far too complex (headers, content parsing) and heavy (large header and content overhead). Recently, binary web service protocols have been developed for low-power wireless networks. A binary web service solution includes the use of a suitable web service protocol (such as simplified HTTP or a binary web service protocol such as Constrained Application Protocol CoAP) and an efficient content encoding (such as Efficient XML Interchange EXI, Binary XML or Fast Infoset FI).

Figure 1:
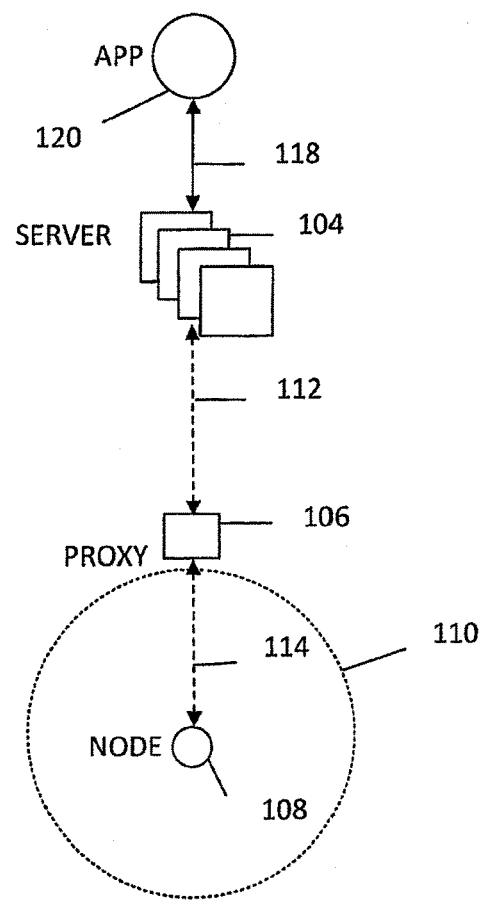
FIG. 1 illustrates an example of a network management system architecture to which disclosed embodiments may be applied.

FIG. 1 illustrates an example of a web service system architecture to which disclosed embodiments may be applied. In at least one disclosed embodiment, the system is configured to efficiently enable one or more backend web applications 120 to make use of constrained embedded nodes 108 over constrained networks 110. The communication is based on IP and a RESTful web service architecture end-to-end. Furthermore, unlike prior art systems that use full web services end-to-end, the proposed system is more efficient and scalable—also being applicable to a much wider range of devices and networks at a lower cost and batter consumption. Two mechanisms related to resource management are introduced: subscriptions and events.

The architecture consists of a server 104, which hosts backend components of the system. Such a server can be realized on anything from a standard personal computer (PC) to a server cloud. The server components can be located on the same apparatus, or distributed across a cluster. Disclosed embodiments are designed to scale from small M2M systems (1000s of nodes) to very large M2M systems (100s of millions of nodes).

The server 104 provides a web service interface to web applications 120 that make use of embedded node resources. The web application may be application run in a browser or in standalone software. The application or software may be run in an apparatus capable of Internet communication. The server is configured to communicate using optimized embedded web service algorithms and protocols with local proxy components 106 or directly with nodes 108 over the M2M interface 112. In at least one disclosed embodiment, the functions of this interface include registration, events, subscription and resource requests. The architecture includes the ability to cluster the backend server across multiple physical or virtual machines (called private or public cloud computing).

In at least one disclosed embodiment, a local proxy component 106 may be utilized to distribute parts of the intelligence of the server to the edges of the architecture. Thus this component has a subset of the server functionality, and from the point of view of nodes 108 in a local constrained network 114 the local proxy looks identical to the server. An M2M interface to the server 112 and an M2M interface to the nodes 114 are used. The local proxy provides discovery, proxy registration, local lookup, subscription aggregation and resource caching services to the nodes using it. There may be any number of local proxies associated with one or more servers.

The constrained nodes 108 in the system have limited memory and processing capabilities, may sleep most of the time, and often operate using a constrained network technology 110. Nodes communicate with local proxies or servers using an M2M interface 114. Each node contains resource registration, eventing and subscription related functionality. The nodes comprise one or more resources which may be utilized by the web applications.

The embedded M2M devices or nodes 108 that are being managed by the NMS server 104 can be connected to the server via IP either directly or via the proxy 106. The interfaces between the node, proxy and server 112, 114 are realized using a binary web service protocol over IP. In at least one disclosed embodiment, the intermediate proxy 106 may help in the registration process, provide extra security, and do intermediate web resource caching on behalf of nodes. The M2M devices 108 reside in a constrained network 110 over which traditional management protocols would be too inefficient. The constrained or low-power wireless network may be a multihop network comprising a set of wireless low-power nodes. In this simplified example, one node 108 is illustrated.

In at least one disclosed embodiment, the wireless links in the wireless network 110 may be realized by using IEEE 802.15.4, with Internet Protocol v6 (6lowpan), IEEE 802.15.4 with ZigBee, Bluetooth or Bluetooth Ultra Low Power (ULP), Low Power Wireless Local Area Network, proprietary low-power radio, cellular radio system or any other system suitable for low-power transmission. IEEE stands for the Institute of Electrical and Electronics Engineers.

Figure 2:
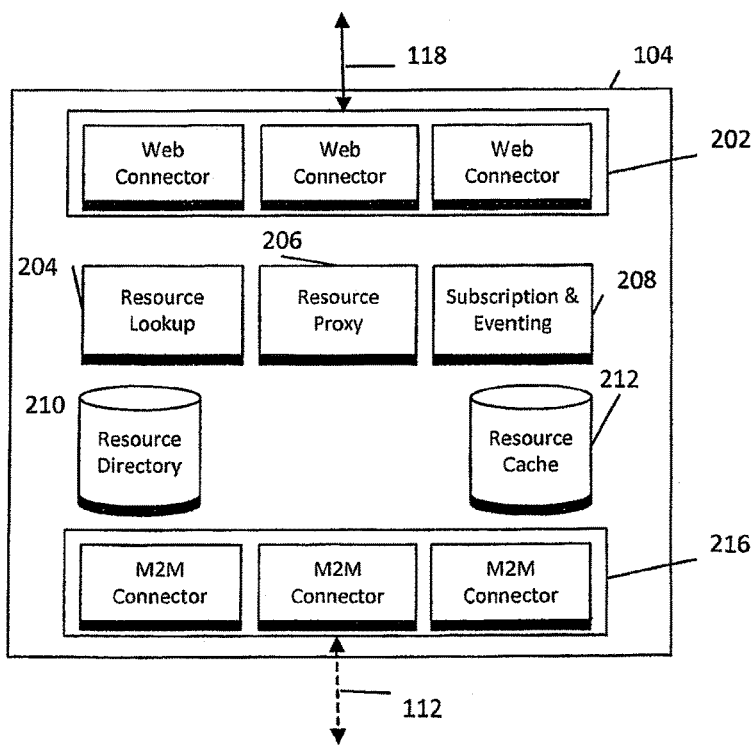
FIG. 2 illustrates an example of a network management system server.

FIG. 2 illustrates an example of a server 104. The server may consist of several components. The server may be used by one or more web applications 120 over a web interface 118. The interface 118 is typically realized over HTTP with XML or JSON payload content where JSON (JavaScript Object Notation) is a known data-interchange format. Mentioned realizations are merely examples as the architecture of the server is transparent to payload type. Interaction of the web applications with the server over the interface uses the REST paradigm. Alternative protocols may be supported, e.g. JMS (Java Message Service) for communication with enterprise Java components, or CoAP when efficiency is needed e.g. when communicating with mobile devices. The server may comprise a Web Connector 202 for each protocol supported by the interface. The Web Connectors realize abstract REST interfaces used by the other server components to access the different protocols available. This makes it possible for to support a new protocol without changing other server components.

The communication with local proxies 106 or constrained nodes 108 are realized in the server using an M2M interface, realized using embedded web services (binary web protocol and payload) for example with the CoAP protocol. Other protocols such as SMS or optimized HTTP are also supported. Each protocol is realized in the server using an M2M Connector 216.

The server further comprises a Resource Directory 210. The server is configured to receive registrations of constrained nodes or end-points 108 operationally connected to the server. The nodes and their web resources (path) along with other meta-data are registered with the Resource Directory either directly by the node, via a local proxy or by another third party. Thus, the Resource Directory is a registry of the resources below the server in the M2M network. This way the Resource Directory eliminates the need for management tools to probe the M2M network directly (which is very inefficient).

The server further comprises a Resource Cache 212. The Resource Cache is a temporary cache of the most recent representation (latest payload value) of node resources. The cache 212 is accessed any time the server receives a request for a resource. The cache is updated any time a response is made or a notification as a result of a subscription is received. This caching greatly improves efficiency as subsequent requests for that resource are fetched internally rather than loading the constrained M2M network.

In at least one disclosed embodiment, the server comprises a Resource Lookup 204 which is configured to provide a lookup interface for web applications 120 and other internal components to discover end-points and resources. A web application or internal component may send a lookup request to the server and the Resource Lookup 204 is configured to handle these requests and reply with necessary information. With the knowledge of the domain, the end-point and a resource a web application or internal component can make a resource request. These requests are handled by a Resource Proxy 206 and the Resource Cache 212. The Resource Proxy is first configured to check if a local cached copy of the requested resource is available. If a valid copy is found, it may be sent as a reply. If the cache does not have a copy of the resource it is requested from the node via an M2M Connector 216.

In at least one disclosed embodiment, the server supports a push interaction model and context awareness via the Subscription & Eventing component 208. Events can be generated by any node and sent to a server using an event name, which is received by this component. Likewise, web applications and other internal components can make subscriptions for resources. Any time the subscribed resource changes on a node, a notification is sent to the Subscription & Eventing component. The results of events and notifications are sent to subscribing entities which may be Web applications or internal components. The subscription and event procedures are described in detail below.

In at least one disclosed embodiment, resources to be managed on a node are represented as web resources. Resources of the nodes may be defined as Uniform Resource Identifier web resource structure. A web resource is identified by a Uniform Resource Locator (URL). A Uniform Resource Locator is a Uniform Resource Identifier (URI) that specifies where a resource is available and the mechanism for retrieving the resource. An example of an URL is the address of a web page on the World Wide Web, such as http://www.example.com/.

Figure 3:
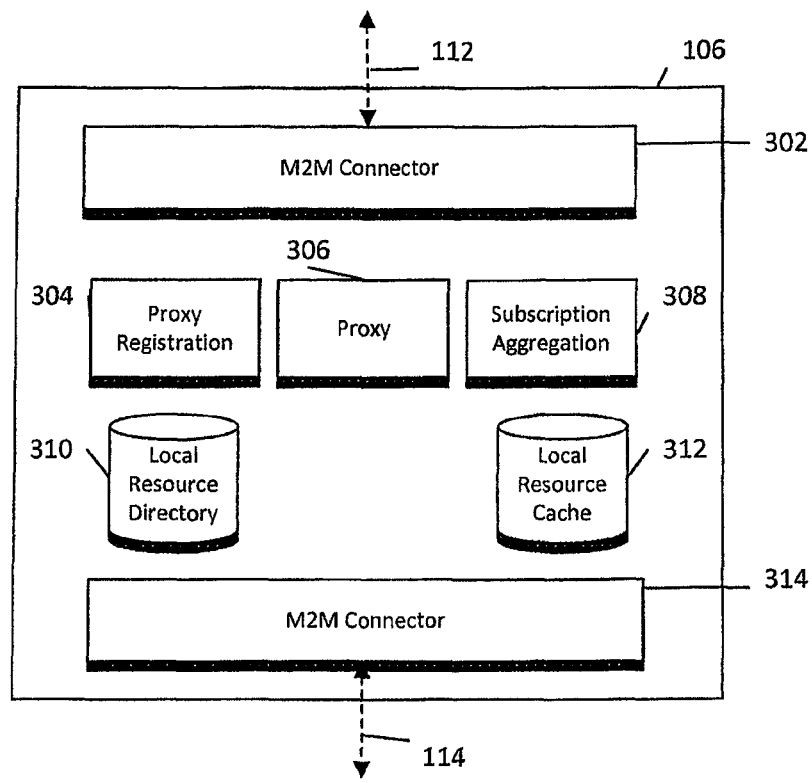
FIG. 3 illustrates an example of a proxy.

FIG. 3 illustrates an example of the components of a local proxy 106. The purpose of a local proxy is to distribute parts of the server 104 to the edges of the system. The local proxy is typically deployed in an embedded device like a WiFi Access Point. The local proxy has two M2M interfaces 302, 314, first interface 302 for communicating 112 with the server 104 and another 314 for communicating 114 with nodes 108. The proxy comprises a Local Resource Directory 310 configured to accept registrations from nodes 108, and store that information locally. The proxy further comprises a Proxy Registration component 304 configured to make a batch registration of those nodes and their resources with the server 104 for efficiency. If a registration is updated or removed by a node, that is also updated with the server by this component.

The proxy comprises a Local Resource Directory 310 configured to provide a discovery service, so that local nodes can find the correct local proxy, and a lookup service, so nodes can discover resource of other local nodes for peer-to-peer communications without loading the system. In these operations incurs no load on connection 112 to the server.

The Resource Proxy component 306 of the proxy accepts incoming requests for resources from the server and attempts to respond using information stored in the Local Resource Cache 312 of the proxy. If requested resource data is not cached, the resources are requested using the M2M interface 314 and valid responses received from the nodes are cached for future use in the Local Resource Cache 312.

In at least one disclosed embodiment, the proxy comprises a Subscription Aggregation component 308 which shields constraint nodes from the need to handle multiple subscriptions for the same resource, for example when multiple servers use the same local proxy. The component 308 handles all the subscription for resources of nodes registered to it, and subscribes to the resources. When multiple subscriptions for the same resource are made, it sends only a single subscription to the actual resources, and then makes the multiple notifications made. This component can also handle the execution of batch subscriptions.

Figure 4:
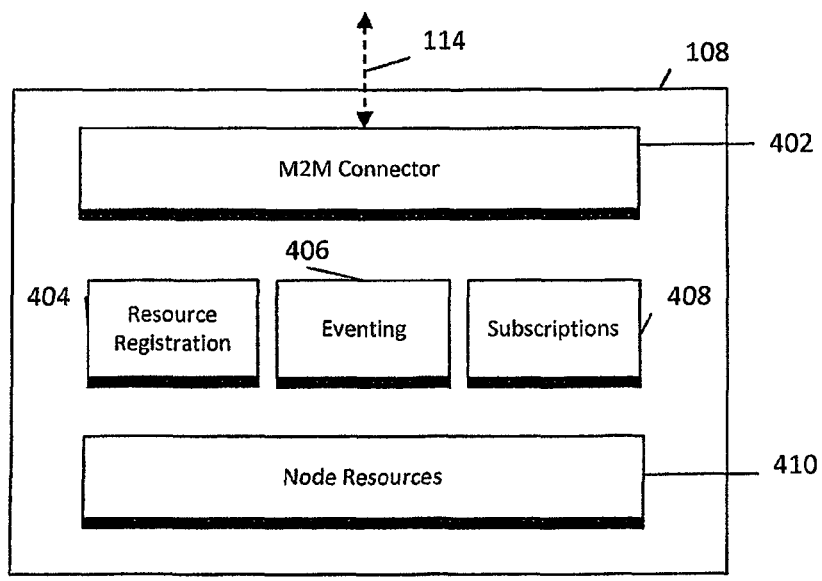
FIG. 4 illustrates an example of a node.

FIG. 4 shows an example of the structure of a node 108. A node has one or more device applications, each registering resources with the Node Resources component 410. When the resources have been registered, the Resource Registration component 404 discovers the location of a Resource Directory for its appropriate domain (either a local proxy or a server) and then registers itself and its resource over the M2M interface 114 using the M2M Connector 402. Device applications can send events to event names using the Eventing component 406. Finally, the Subscriptions component 408 is configured to accept incoming subscriptions for resources, and then manage the sending of notifications to subscribers by interacting with the device applications each time a resource changes.

Node or nodes may have resources of different types registered. A basic type of resource is one which may have a given value. A web application may request the node the value, the value is read and reported back to the web application typically immediately after receiving the request. An observable resource is a resource on a node that supports a special observation feature. The observation feature allows asynchronous notifications to be sent from the node to the server each time the resource changes.

In following, the subscription and event procedures are described in more detail. In subscription, a server makes a special observe request, which results in a node to server notification each time the resource changes. In event procedure, a node comprises pre-configured events. Web applications may create event names at the server. When a given event occurs, the node is configured to send a notification to the associated event name that the event occurred. Web applications may subscribe to these events.

The nodes 108 of the system are configured to register their end-points and resources with the Resource Directory either directly with the server 104 or via the proxy 106. In at least one disclosed embodiment, the registration is performed using a REST interface containing query parameter meta-data and a body with a link description for each resource. The server stores the end-point, its resources and associated meta-data in the Resource Directory 210. Once the data is in the Resource Directory the data can be looked up, resources requested or subscriptions made.

Example of a registration message where an end-point called node 341 registers three resources with the Resource Directory. The "obs" attribute indicates that this is an observable resource.

```
POST /rd?host=node341
Body:
<s/light>;rt="Lux";obs,</s/temp>;rt="Cel",</a/relay>;rt="Boolean"
```

In this example, the node registers a light resource, a temperature resource and a Boolean resource, such as a switch or a relay. The light resource is an observable resource.

The server offers a REST subscription interface for the web applications to browse subscriptions, create new subscriptions, create event names, and to receive streams of notifications. The server provides the web applications (and internal components) a possibility to subscribe to observable resources or application events. Once subscriptions have been made, the server is configured to receive notifications from the nodes as a result of these subscriptions and events.

In at least one disclosed embodiment, the server is configured to provide an interface to enable a web application to subscribe to observable resources using different scopes. In at least one disclosed embodiment, this interface is realized as a REST interface or a JMS interface. The subscriptions are modified using GET (read subscription), PUT (create subscription) and DELETE (remove subscription) methods on those URIs. In this example realization, the following three interfaces allow subscription to observable resources in different scopes. The first interface allows subscription to a single resource of an end-point in a domain:

/subscription/resource/{end-point-name}.{domain}/{uri-path}.

The second interface subscribes to all the resources registered for an end-point in a domain:

/subscription/endpoint/{end-point-name}.{domain}.

The third interface subscribes to all the resources in a domain:

/subscription/domain/{domain}.

Combinations of the above interfaces are naturally possible, for example subscribing to all the resources in a domain that have the same address path. Furthermore, other scopes and variables may be included in the subscription. For example, meta-data variables may be included in the query string part of the interface. For example:

/subscription/endpoint/{end-point-name}.{domain}?rt=Lux.

In a similar way, an interface to create (PUT) and retrieve (GET) application events can be realized using a REST interface. When a new event name is created, it is then available for receiving application events from the nodes through the M2M interface. The following interface can be used for retrieving or creating an application event name.

/subscription/event/{domain}/{event_name}.

Once subscriptions for observable events or for application events have been created, a mechanism for collecting all the resulting notifications using a domain scope may be provided. This greatly improves the efficiency and scalability of the server: an application interface as a single TCP connection per domain is all that is needed to handle large numbers of nodes and resources. In one realization, the notification interface is a REST interface with a domain component. Notifications are received by doing an HTTP long polling GET on this interface. The response is a stream of JSON objects containing arrays of notifications. These notifications can be the result of observable resource updates or of application events being received.

Furthermore, it is possible for the Resource Directory component of the Server to send notifications to web application via this interface. These include End-point creation and removal notifications, which are important for a web application to know when new nodes and resources are available (or no longer available).

For example, assume that a node has an observable resource which is an infrared IR motion sensor. This would be modeled as a /motion resource on a node and marked as Observable when registered. When a web application wishes to receive notifications about changes in the motion sensor, it makes a subscription to the server. This results in an Observation GET request to the /motion resource. After that, each time a new /motion resource is available (it might be a counter of motion IR clicks), the node is configured to send an asynchronous notification to the server. The server is configured to send a JSON object of the new representation to each web application that is polling for notifications.

The following example shows one possible structure of a notification JSON object. The object comprises four independent messages. There an "update" type is related to an observable resource from the end-point (ep) on the path (uri), along with meta-data about the resource, where "if" denotes the interface that the resource provides, the payload "ct" (content-type) and finally the payload itself "val". The "update" messages are notifications that the resource value has changed. Similarly, the "event" type includes the name of the event "app" along with the same meta-data and value fields. The "event" message informs the recipient that the event has occurred. The "create" type indicates that a new end-point was registered with the Resource Directory.

```
GET /events/observe/{domain}
200 OK
{"event":[
   {"type":"create",
    "payload":{
  "ep":"node5",
     "uri" :"/motion"}},
   {"type":"update",
    "payload":{
  "ep":"node1",
     "uri" :"/s/light",
     "if":"ns.wadl#s",
     "ct":"{resource-mime-type}",
  "val":"light sensor value"}},
   {"type":"update",
    "payload":{
    "ep":"node1",
    "uri":"/s/heat",
    "if":"ns.wadl#s",
    "ct":"{resource-mime-type}",
  "val":"heat sensor value"}},
   {"type":"event",
    "payload":{
    "app" :"app1",
    "if":"{resource-interface}",
  "ct":"resource-mime-type}",
     "val":"sensible event data"
    }}
 ]}
```

Figure 5:
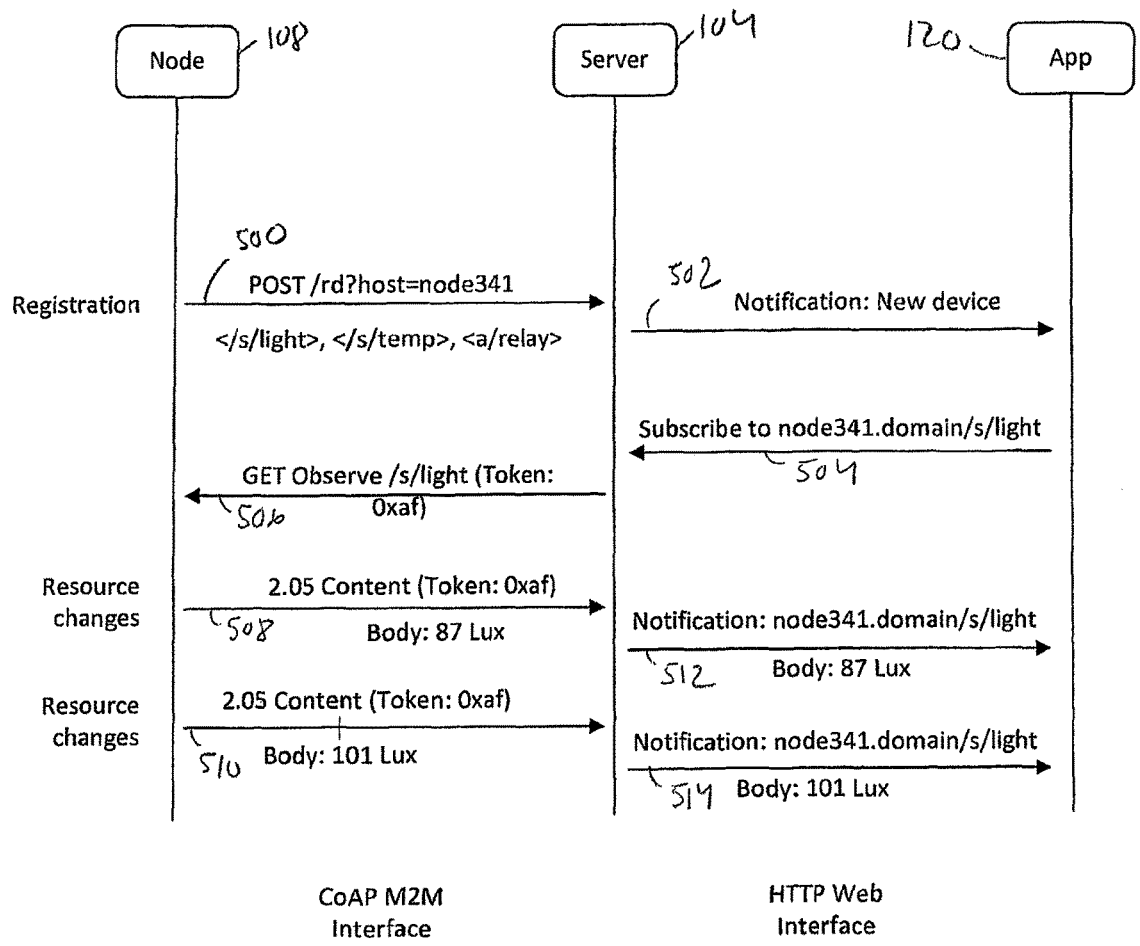
FIG. 5 shows an example of a message exchange diagram for subscriptions to observable resources.

FIG. 5 shows an example of a message exchange diagram between a web application 120, a server 104 and a node 108 for subscriptions to observable resources. First, each node 108 registers 500 with the Resource Directory of the server 104. This registration includes the resources available on the server, along with meta-data about those resources including whether it supports observation. In FIG. 5 it is assumed that the web application 120 has already made a request to the notification interface of the server 104.

When a new node 108 registers with the server 104, an entry is made in the Resource Directory of the server. In the entry, an observation flag for each resource indicates if it is an observable resource. When the new entry is made in the Resource Directory, a Create notification 502 is sent to the web application 120. The web application will then subscribe 504 to a specific resource, the whole end-point or the domain of interest. In this example it subscribes to the /s/light resource of node 341. The observation 506 is then made using the M2M interface from the server 104 to the node 108.

Every time the subscribed resource changes the node 108 is configured to send a notification 508, 510 to the server 104. The server sends a notification 512, 514 to the web application subscribing the resource. The realization of the notification depends on the used protocol. In HTTP; a long poll method may be used, for example.

Figure 6:
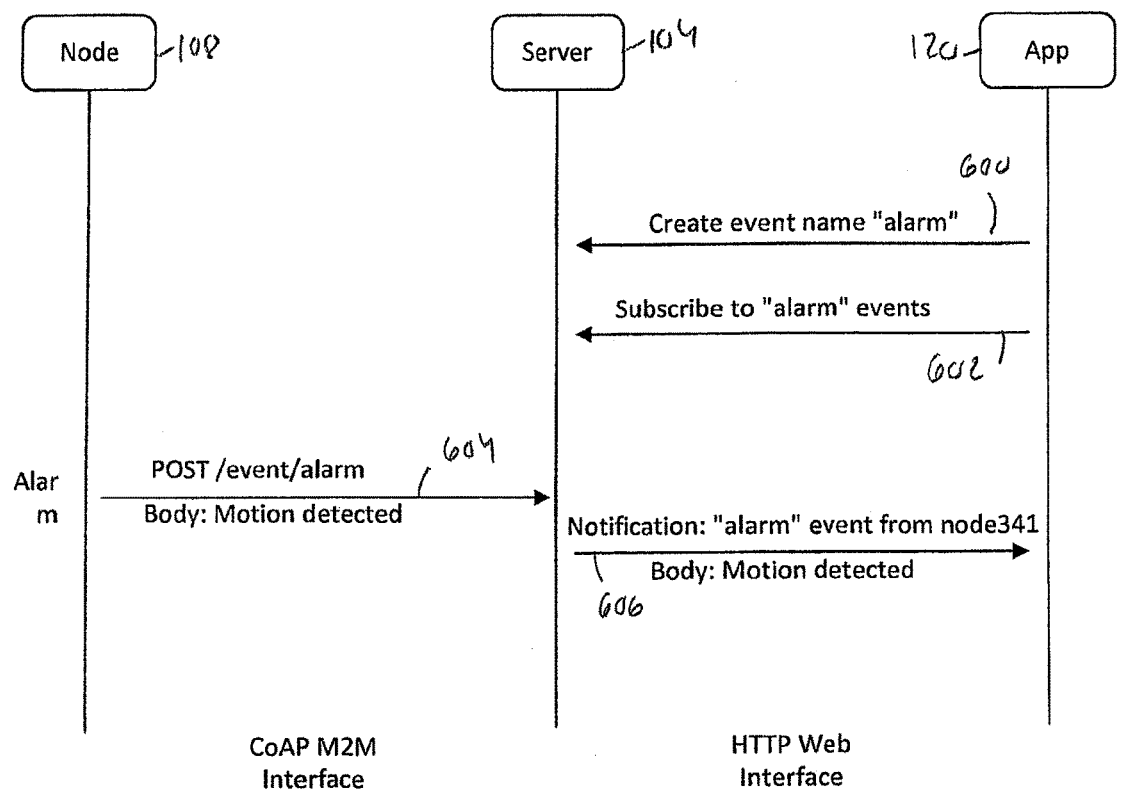
FIG. 6 shows an example of a message exchange diagram for subscribing application events.

FIG. 6 shows an example of a message exchange diagram between a web application 120, a server 104 and a node 108 for subscribing application events. First, the web application 120 creates 600 a new Application Event called "alarm". The web application then subscribes 602 to the "alarm" event and then waits for notifications. Each time a node 108 sends 604 an Application Event to the /event/alarm resource on the M2M interface, a corresponding Event notification 606 is sent from the server 104 to the subscribing web applications.

Figure 7:
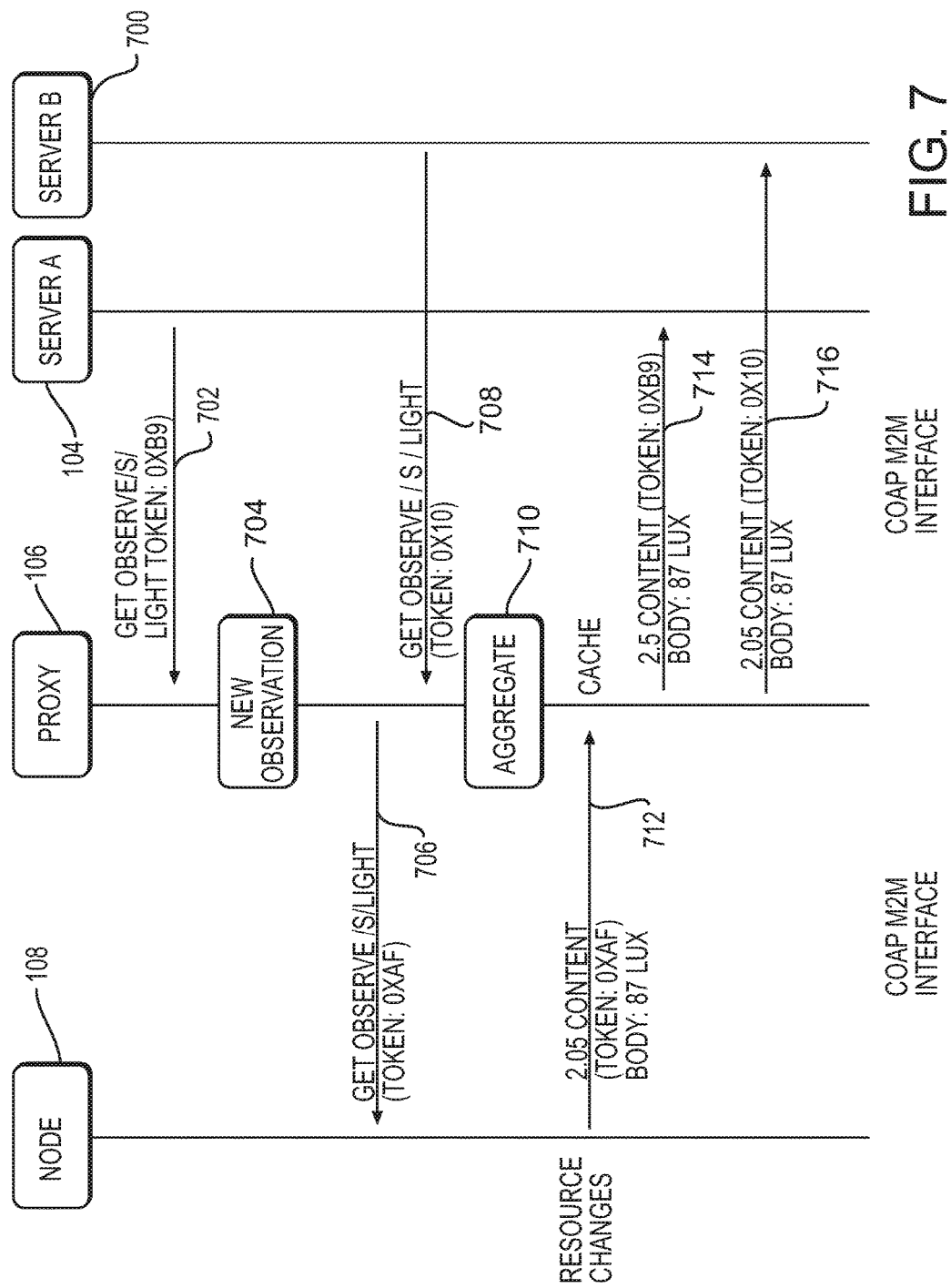
FIG. 7 illustrates an example of a message exchange diagram for aggregation functionality of a proxy.

FIG. 7 illustrates an example of a message exchange diagram between a first server A 104, a second server B 700, a proxy 106 and a node 108 for the aggregation functionality of a proxy intermediate. Below, we also refer to FIG. 3. In this example the proxy 106 has already accepted registrations from nodes and has registered those resources with the Resource Directory. In at least one disclosed embodiment, the proxy 106 can make resources observable, even if that is not supported by the node itself. The proxy simply adds the observable flag when it registers the resources. This function is performed by the Proxy Registration component 304, 310. The proxy then acts as if those resources were its own, and answers on behalf of the nodes for any requests for which it has cached resource representations 306, 312.

Subscription Aggregation 308 is performed in real time. When the first server A 104 subscribes 702 to the /s/light resource of the node 108, the proxy 106 creates a subscription entry 704 locally including, and then observes 706 the resource of the Node 108 if observation is supported, or alternatively polls the resource periodically. When a second server B 700 subscribes 708 to that same resource, the proxy 106 performs subscription aggregation 710 and combines that into the same subscription entry. It should be noted that the IP address, port and Token of the subscription is stored for each subscriber to that resource. When a notification 712 (or updated resource result) is received for the /s/light resource of that node 108 by the proxy 106, then a notification 714, 716 is sent by the proxy to each subscriber in the entry for that resource.

In at least one disclosed embodiment, batch subscriptions are supported. When a web application wants to subscribe to many resources on an end-point, or to all the resources on an end-point, the standard observation mechanism on the M2M interface is inefficient, as it requires a separate request for each resource observation. In at least one disclosed embodiment, a more efficient mechanism called batch subscription is utilized. In the batch subscription mechanism, each node supports a special resource e.g. /obs for the purpose of making batch subscriptions. Batch subscriptions are made by sending a POST (or PUT) request to that resource, with a list of links in the payload. Each link corresponds to a new (or updated) subscription, and must include a token field that indicates the token identifier to be included in each notification. By default, notifications are sent to the source IP address and port that made the batch request as in the example below:

```
POST coap://node341/obs
Payload:
   </s/light>;token="0x890",
   </s/temp>;token="0x891",
   </a/relay>;token="0x892"
```

In at least one disclosed embodiment, the system may comprise nodes which may be contacted by a server or a proxy only using an external messaging system such as the short message service SMS of a Global System of Mobile Communication (GSM) system. In such cases, for example when making a CoAP batch subscription over SMS, the source IP address and port are included with a query string parameter con= that includes the IP address and port to send notifications to:

```
POST coap://node341/obs?con="192.168.0.34:8000"
Payload:
   </s/light>;token="0x890",
   </s/temp>;token="0x891",
   </a/relay>;token="0x892"
```

This way the node may be instructed to contact the server or proxy not by using an SMS but contacting another IP address.

A further optimization of the batch mechanism may be used that allows a collection of resources to be subscribed to:

```
POST coap://node341/obs
Payload:
</s>;token="0x900",
</a>;token="0x901"
```

When this is done, any time that resource or any of its sub-resources are updated, the updated resource representations are sent as an array of JSON objects. This reduces the number of links that need to be sent, along with the number of notification messages sent when resources change.

In at least one disclosed embodiment, the apparatus implementing aspects may be realized as software in a node, a server, a computer or a set of computers connected to Internet and a binary web service domain directly or via a proxy router or server.

The computer programs may be in source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital controller or it may be distributed amongst a number of controllers.

Some disclosed embodiments may be realized by an apparatus, comprising a binary web service interface means for communicating with nodes operationally connected to the apparatus using a binary web service, the nodes comprising one or more resources, the binary web service interface being configured to receive information from a node whenever a resource of a node changes or whenever a pre-configured event regarding a resource occurs; means for communicating with web applications making use of the resources, and means for receiving subscriptions regarding the information received from the nodes and providing the subscribed information.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus, comprising:
an interface to communicate with nodes operationally connected to the apparatus, the nodes comprising one or more resources, the interface being configured to:
receive from a node a registration comprising information on the address and the resources of the node, and information on which resources have pre-configured events and which may be subscribed, and
receive information from a node whenever a pre-configured event regarding a resource occurs;
an interface for communicating with web applications making use of the resources; and
a software component for:
notifying a web application when a node has registered, the notification comprising information on the resources of the node and on which resources have pre-configured events which may be subscribed; and
receiving, from a web application, a request to subscribe to at least some of the information received from the nodes, and providing the subscribed information responsive to the received request.

2. The apparatus of claim 1, wherein the apparatus is configured to request a node to send a notification whenever a given resource of the node changes.

3. The apparatus of claim 2, wherein the apparatus is configured to send a notification request to a node after receiving a subscription regarding the resource.

4. The apparatus of claim 1, further comprising:
a resource directory to store property information and address of the nodes; and
a resource cache for storing information received from the resource nodes.

5. The apparatus of claim 1, wherein the apparatus is configured to receive from a web application a request to create a name to a pre-configured event and a subscription to the event.

6. The apparatus of claim 2, wherein the apparatus is further configured to aggregate several subscriptions of a same resource received from web applications to a single notification request.

7. The apparatus of claim 2, wherein the apparatus is further configured to send a node a batch notification request regarding more than one resource of the node.

8. The apparatus of claim 1, wherein the apparatus is configured to receive requests regarding a resource of a node, and on the basis of the number of requests send the node a request to send a notification whenever the resource of the node changes.

9. The apparatus of claim 1, wherein the interface is a binary web service interface, and the nodes are operationally connected to the apparatus using a binary web service protocol.

10. The apparatus of claim 1, wherein the interface is a binary web service interface, and the nodes are operationally connected to the apparatus using a hypertext transfer protocol (HTTP).

11. The apparatus of claim 1, wherein the interface of the apparatus is configured to receive information from a node whenever a resource of the node changes and whenever a pre-configured event regarding a resource occurs.

12. An apparatus, comprising:
a first interface to communicate with nodes operationally connected to the apparatus, the nodes comprising one or more resources, the interface being configured to receive information from a node on which resources have pre-configured events and which may be subscribed, and receive information from a node whenever a pre-configured event regarding a resource occurs;
a second interface for communicating with a server; and
a software component for:
notifying the server when a node has registered, the notification comprising information on the resources of the node and on which resources have pre-configured events which may be subscribed; and
receiving, from the server, a request to subscribe to at least some of the information received from the nodes, and providing the subscribed information responsive to the received request,
wherein the apparatus is configured to, responsive to the received request, request a node to send a notification whenever a pre-configured event regarding a resource of the node occurs.

13. The apparatus of claim 12, wherein the apparatus is further configured to aggregate several subscriptions of a same resource received from more than one server to a single notification request.

14. The apparatus of claim 12, wherein one or both of the first interface and the second interface is a binary web service interface which uses a binary web service protocol.

15. The apparatus of claim 12, wherein one or both of the first interface and the second interface is a binary web service interface which uses a hypertext transfer protocol (HTTP).

16. A method, comprising:
communicating with nodes operationally connected to an apparatus using a web service, the nodes comprising one or more resources;
receiving from a node a registration comprising information on the address and the resources of the node, and information on which resources have pre-configured events which may be subscribed;
receiving information from a node whenever a pre-configured event regarding a resource occurs;
providing a notification when a node has registered, the notification comprising information on the resources of the node and on which resources have pre-configured events which may be subscribed;
receiving a request to subscribe to at least some of the information received from the nodes; and
providing the subscribed information responsive to the received request.

17. The method of claim 16, further comprising:
requesting a node to send a notification whenever a given resource of the node changes.

18. The method of claim 16 wherein the web service is a binary web service which uses one of: a binary web service protocol and a hypertext transfer protocol (HTTP).

* * * * *